United States Patent
Doyle (10) Patent No.: US 12,218,796 B1
(45) Date of Patent: Feb. 4, 2025

(54) SECURE NETWORK DEVICE PROVISIONING WITH REMOVABLE STORAGE DEVICE

(71) Applicant: Arista Networks, Inc., Santa Clara, CA (US)

(72) Inventor: Eamon Doyle, Dublin (IE)

(73) Assignee: Arista Networks, Inc., Santa Clara, CA (US)

( * ) Notice: Subject to any disclaimer, the term of this patent is extended or adjusted under 35 U.S.C. 154(b) by 0 days.

(21) Appl. No.: 18/485,959

(22) Filed: Oct. 12, 2023

(51) Int. Cl.
- *H04L 41/0806* (2022.01)
- *G06F 9/4401* (2018.01)
- *H04L 9/40* (2022.01)

(52) U.S. Cl.
CPC ........ *H04L 41/0806* (2013.01); *G06F 9/4416* (2013.01); *H04L 63/12* (2013.01)

(58) Field of Classification Search
CPC .... H04L 41/0806; H04L 63/12; G06F 9/4416
See application file for complete search history.

(56) References Cited

U.S. PATENT DOCUMENTS

| | | | |
|---|---|---|---|
| 2020/0213191 A1* | 7/2020 | Watsen | H04L 61/5014 |
| 2021/0297409 A1* | 9/2021 | Rahn | H04L 63/0823 |
| 2022/0405106 A1* | 12/2022 | Mandramoorthy | G06F 9/4416 |
| 2023/0208652 A1* | 6/2023 | Kumar | H04L 9/3247 |
| | | | 713/175 |

OTHER PUBLICATIONS

OMA "OMA Device Management Bootstrap" https://www.openmobilealliance.org/release/DM/V1_3-20120306-C/OMA-TS-DM_Bootstrap-V1_3-20120306-C.pdf (Year: 2012).*
U.S. Appl. No. 18/491,643, filed Oct. 20, 2023.

* cited by examiner

*Primary Examiner* — James E Springer
*Assistant Examiner* — Patrick F Ngankam
(74) *Attorney, Agent, or Firm* — Treyz Law Group, P.C.; Tianyi He (57) ABSTRACT

A network device may be coupled to a removable storage device. The network device may process redirect information stored on the removable storage device to connect to a device configuration server indicated by the redirect information. The network device may complete a device provisioning operation based on configuration information obtained from the device configuration server and report status of the device provisioning operation to the device configuration server.

20 Claims, 6 Drawing Sheets

SECURE NETWORK DEVICE PROVISIONING WITH REMOVABLE STORAGE DEVICE

BACKGROUND

This relates to network devices, and more particularly, to network devices configured to obtain device provisioning information.

In one illustrative system, a network device can obtain the device provisioning information as part of a device self-provisioning operation. As an example, an initially un-provisioned network device may connect to a server from which the device provisioning information is obtained.

DETAILED DESCRIPTION

A network can convey network traffic (e.g., in the form of packets, frames, etc.) between host devices. To properly route and forward the network traffic, the network can include a number of network devices configured with networking data such as forwarding decision data, routing decision data, network policy information, etc.

Network devices typically require provisioning to be operational within the network. To simplify the process of provisioning a network device for operation, the network device may initiate its own provisioning operation (sometimes referred to as a self-provisioning operation). The network device may, as part of the provisioning operation, obtain one or more configuration files (sometimes referred to as configuration information or configuration artifacts) and process the obtained one or more configuration files to perform the self-provisioning operation. At the end of a successful self-provisioning operation, the network device may be configured with the appropriate data (e.g., networking data) such that the network device may perform corresponding networking functions within the network.

The network device may obtain the configuration file(s) from one of many sources such as a network address assignment server, a removable storage device, and a bootstrap server, as just a few examples. However, the use of each of these sources for configuration files has its own limitations. Consider, as an example, when a removable storage device is used to obtain configuration files, the obtained configuration files can be out-of-date as the configuration files are typically installed onto the removable storage device well in advance of the storage device being coupled to (e.g., plugged into) the network device (e.g., possibly weeks if not months in advance of deployment). Furthermore, when interacting solely with the removable storage device to obtain the configuration files, the network device does not necessarily send progress reports to a centralized entity accessible by network administrators, thereby preventing centralized monitoring of the status of provisioning and any newly provisioned network devices. Additionally, the removable storage device may not be a particularly good mechanism for distributing some types of configuration information such as different boot image versions (e.g., in comparison to a device configuration server). Even with these limitations, the use of a removable storage device that is physically receivable by (e.g., pluggable into) the network device can simplify and/or secure the device provisioning process, which is desirable in at least certain deployments.

It may therefore be desirable to enhance the use of the removable storage device to facilitate the provisioning operation while addressing (e.g., eliminating) at least some of the above-mentioned limitations. Accordingly, in some illustrative arrangements described herein as an example, a removable storage device may store, among other supplemental device provisioning information, redirect information for connecting to a device configuration server. When the storage device is removably coupled to (e.g., plugged into) a network device, the network device may access and process the redirect information to connect to the device configuration server (e.g., via a secure and trusted connection enabled by supplemental validation information stored on the storage device along with the redirect information) and obtain configuration files from the device configuration server via the connection. With the inclusion of the device configuration server in addition to the removable storage device in the provisioning process, the network device may obtain more current configuration information (including a desired boot image version) from the device configuration server and report provisioning status and progress to the device configuration server, while using the removable storage device to establish the initial connection to the device configuration server to simplify and/or secure the provisioning process. This may also remove a need to communicate with another server (e.g., a network address assignment server) to obtain the redirect information, which may be less secure.

Figure 1:
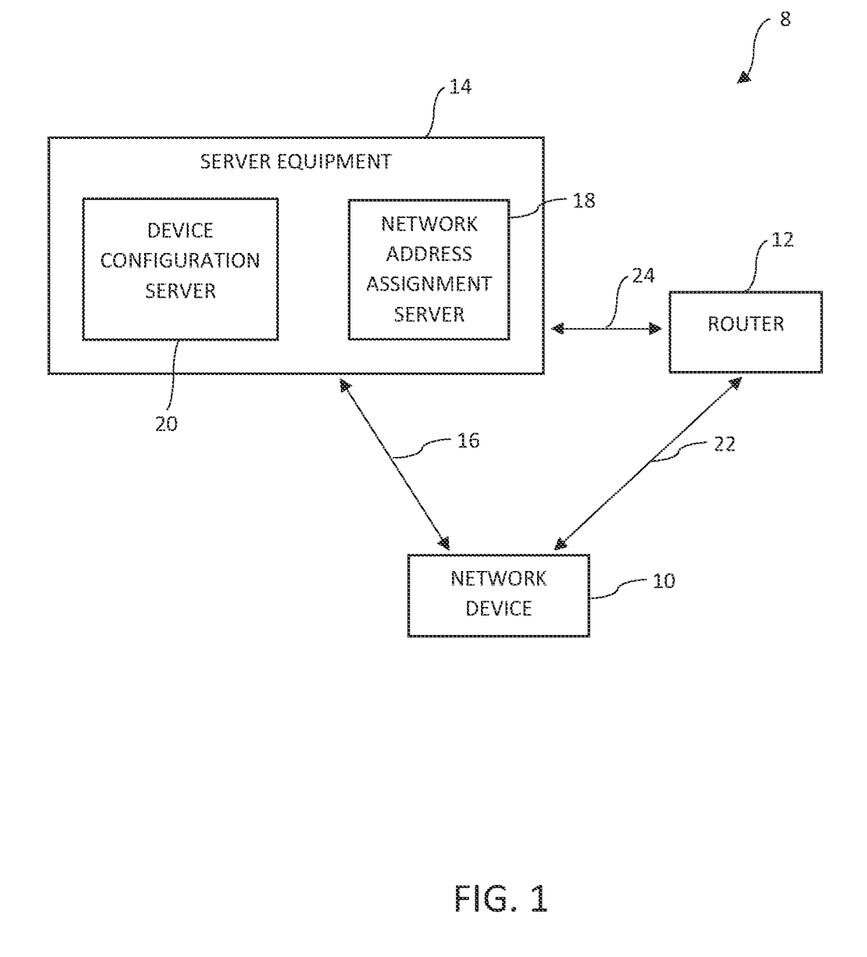
FIG. 1 is a diagram of an illustrative network in which a network device is configured to obtain device provisioning information in accordance with some embodiments.

The contexts and/or advantages described above are merely illustrative. If desired, any suitable system may employ the mechanism(s) described above and/or further detailed herein to improve the device provisioning process (e.g., impart the above-mentioned advantages and/or other advantages). An illustrative networking system in which a network device is configured to perform a device provisioning operation is shown in FIG. 1. In particular, FIG. 1 shows an illustrative network (portion) 8 which may be of any suitable scope and/or form part of a larger network of any suitable scope. As examples, network 8 may include, be, or form part of one or more local segments, one or more subnets, one or more local area networks (LANs), one or more campus area networks, a wide area network, etc. Network 8 may include any suitable number of different network devices that connect corresponding host devices of network 8 to one another. At least some of these network devices may be connected by one or more wired technologies or standards such as Ethernet (e.g., using copper cables and/or fiber optic cables), thereby forming a wired network portion. If desired, network 8 may also include a wireless network portion extending from the wired network portion. If desired, network 8 may include or be coupled to internet service provider networks (e.g., the Internet) or other public service provider networks, private service provider networks (e.g., multiprotocol label switching (MPLS) networks), and/or other types of networks such as telecommunication service provider networks (e.g., a cellular network based on one or more standards as described in the 3GPP specifications such as GSM, UMTS, LTE, 5G, etc.).

In general, network devices in network 8 can include any number of switches (e.g., single-layer (L2) switches and/or multi-layer (L2 and L3) switches), bridges, routers, gateways, hubs, repeaters, firewalls, wireless access points, network devices serving other networking functions, network devices that include the functionality of two or more of these devices, management (controller) devices that control the operation of one or more of these network devices, and/or other types of network devices.

In the example of FIG. 1, the network devices of network 8 include at least network device 10, such as a multi-layer switch or another type of network device, and router 12. Network 8 may also include one or more host devices or host equipment such as server equipment 14. Configurations in which network device 10 is an un-provisioned network device (e.g., not a fully provisioned network device) when initially coupled or connected to other elements of network 8 are sometimes described herein as an illustrative example.

In these configurations, network device 10 may communicate with different portions of server equipment 14 via one or more communication paths 16 in an attempt to perform a network device provisioning operation that provisions and configures device 10 itself for operation. In particular, network device 10 may first communicate with a network address assignment server 18 implemented on server equipment 14 (e.g., a DHCP server such as server equipment implementing DHCPv4, implementing DHCPv6, implementing a variation of DHCP, implementing a server that is compatible with DHCP, and/or implementing other network address assignment protocols) to obtain a network address, or generally device interface configuration information, for network device 10. After obtaining its network address, network device 10 may generate one or more network interfaces based on the obtained device interface configuration information.

Network device 10 may further obtain configuration data (e.g., networking data, boot image information, etc.), executable files (e.g., compiled binary executable files, script-based executable files, etc.), and/or other configuration files from a source of configuration information such as device configuration server 20 (sometimes referred to as bootstrap server 20 or device bootstrapping server 20). Configurations in which a storage device removably coupled to network device 10 facilitates the connection between device 10 and the source of configuration information are sometimes described herein as illustrative examples. These illustrative examples are further detailed below (e.g., in connection with FIGS. 2-6).

Network device 10 may be considered fully provisioned and ready to perform networking operations (e.g., routing protocols, traffic routing, traffic forwarding, etc.) after successfully executing the obtained executable files such as compiled binary executable files and/or script-based executable files, storing the obtained configuration data (e.g., networking data, the boot image information, etc.), and/or generally processing the configuration file(s), as examples.

While both shown in FIG. 1 to be within server equipment 14, servers 18 and 20 may be implemented on distinct and separate pieces of server computing equipment (e.g., on different processing circuitry or sets of processors, using different storage circuitry accessible by the corresponding processing circuitry, on the same or different server racks, etc.) at server equipment 14 or may be implemented on shared computing equipment (e.g., the same processing circuitry or set of processors, using the same storage circuitry accessible by the processing circuitry, etc.) at server equipment 14. Servers 18 and 20 may be implemented at different sites or generally on different network portions of network 8 (e.g., on different local segments) or may be implemented at the same site (e.g., on the same local segment or different local segments).

Before, when, and/or after communicating with server equipment 14 as part of the device provisioning operation, network device 10 may be in communication with router 12 via one or more communication paths 22. As examples, router 12 may be a router on the same local segment or subnet as network device 10, server 18, and/or server 20, may be an edge router or gateway, may be a core router, may be a virtual router implemented on server equipment, or generally may be a router implemented in any suitable manner at any suitable location within network 8. Router 12 may be communicatively coupled to server equipment 14 (e.g., server 18 and/or server 20) via one or more communication paths 24.

Communication paths 16, 22, and 24 may be implemented using network paths of network 8. These network paths may include direct cable connections with or without intervening network devices. In other words, each path 16, each path 22, and/or each path 24 may span across portions of network 8 (e.g., one or more network devices therein) to provide the connectivity illustrated in FIG. 1. While shown in FIG. 1 as separate paths, paths 16, 22, and 24 may include paths or path portions that overlap one another.

In one illustrative arrangement, a given path 16 may be implemented by paths 22 and 24 and intervening router 12. In an arrangement where network device 10 lacks a direct connection to server equipment 14, any connection between network device 10 and server equipment 14 may include router 12 (e.g., serving as a relay device). In particular, router 12 may contain a relay agent executing on its processing circuitry to perform relaying of address assignment messages (e.g., DHCP messages) for network device 10 and server equipment 14 (or more specifically, server 18). This relaying of DHCP messages and/or other types of messages occurs prior to device 10 having or being assigned a network address and thus will differ from normal packet forwarding (e.g., forwarding of packets that identify the network address of device 10).

If desired, other routers and/or network devices (e.g., in addition to router 12) may also serve as relay devices to relay DHCP messages and/or other messages between device 10 and server equipment 14 (e.g., server 18). In general, any number of intervening (relay) devices (e.g., zero, one, two, etc.) at any suitable locations (e.g., along paths 16, 22, and/or 24) may be involved in the conveyance of messages such as network address assignment messages, or generally device configuration request and response messages as described herein, between network device 10 and server equipment 14 (e.g., between device 10 and server 18, between device 10 and server 20, etc.).

Figure 2:
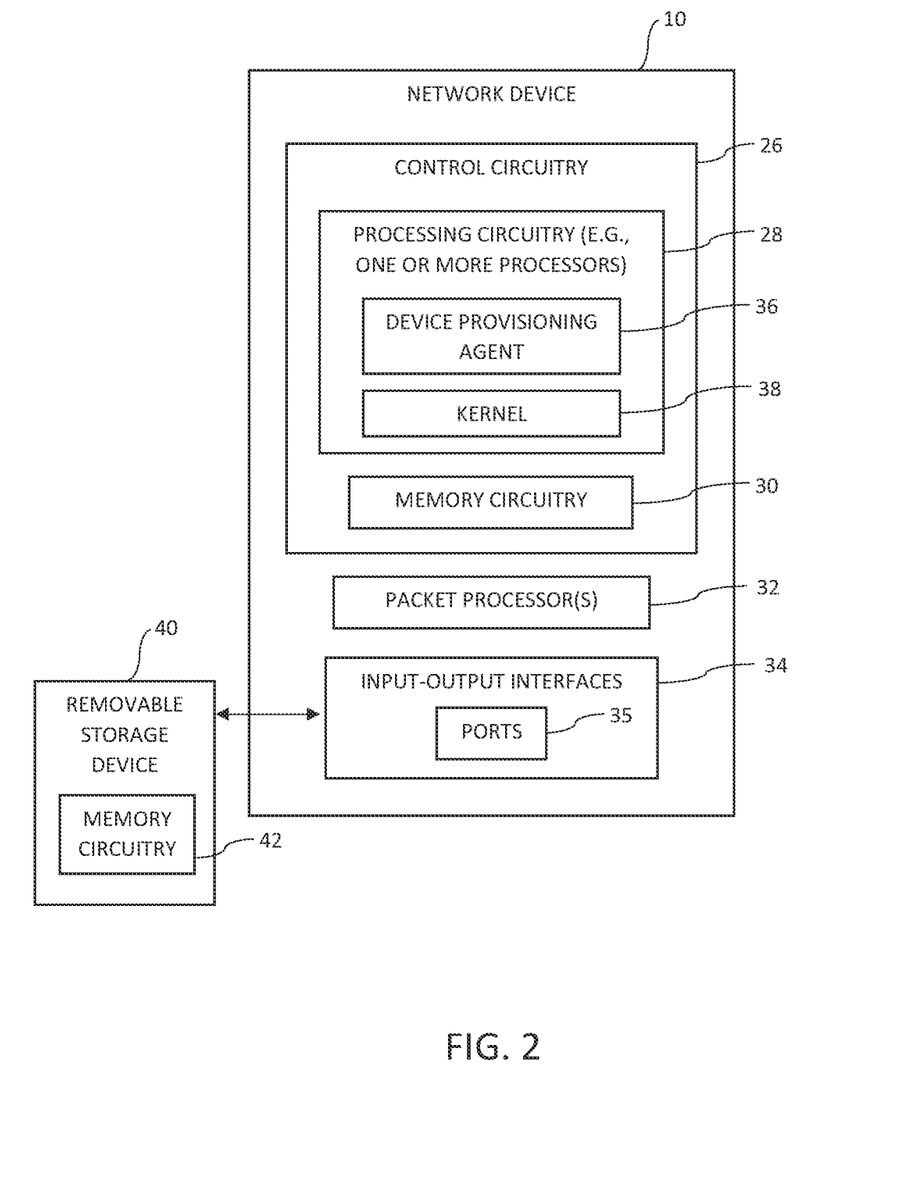
FIG. 2 is a diagram of an illustrative network device configured to operate with a removable storage device in accordance with some embodiments.

FIG. 2 is a diagram of an illustrative network device such as network device 10 in FIG. 1. In some configurations described herein as an illustrative example, network device 10 may be an un-provisioned multi-layer switch or other type of network device that automatically initiates a device provisioning operation to provision itself after being introduced to network 8 in FIG. 1 (e.g., after being communicatively coupled to components of network 8 such as router 12 and/or server equipment 14).

As shown in FIG. 2, network device 10 may include control circuitry 26 having processing circuitry 28 and memory circuitry 30, one or more packet processors 32, and input-output interfaces 34 (e.g., network interfaces) mounted within a housing and/or on a support substrate of network device 10. In one illustrative arrangement, network device 10 may be or form part of a modular network device system (e.g., a modular switch system having removably coupled modules usable to flexibly expand characteristics and capabilities of the modular switch system such as to increase the number of ports, provide specialized functionalities, etc.). In another illustrative arrangement, network device 10 may be a fixed-configuration network device (e.g., a fixed-configuration switch) having a fixed number of ports and/or a fixed hardware configuration.

Processing circuitry 28 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Processing circuitry 28 may run (e.g., execute) a network device operating system and/or other software/firmware that is stored on memory circuitry 30. Memory circuitry 30 may include one or more non-transitory (tangible) computer-readable storage media that stores the operating system software and/or any other software code, sometimes referred to as program instructions, software instructions, software, data, instructions, or code. As an example, the device provisioning operation utilizing a removable storage device as described herein may be stored as (software) instructions on the one or more non-transitory computer-readable storage media (e.g., in portion(s) of memory circuitry 30 in network device 10). The corresponding processing circuitry (e.g., one or more processors of processing circuitry 28 in network device 10) may process or execute the respective instructions to perform the corresponding device provisioning operation utilizing the removable storage device.

Memory circuitry 30 may be implemented using non-volatile memory (e.g., flash memory or other electrically-programmable read-only memory configured to form a solid-state drive), volatile memory (e.g., static or dynamic random-access memory), hard disk drive storage, removable storage devices (e.g., storage device removably coupled to device 10), and/or other storage circuitry. Processing circuitry 28 and memory circuitry 30 as described above may sometimes be referred to collectively as control circuitry 26 (e.g., implementing a control plane of network device 10).

As other illustrative operations in addition to the device provisioning operation, processing circuitry 28 may execute network device control plane software such as operating system software, routing policy management software, routing protocol agents or processes, routing and/or forwarding information base agents, and other control software, may be used to support the operation of protocol clients and/or servers (e.g., to form some or all of a communications protocol stack such as the TCP/IP stack), may be used to support the operation of packet processor(s) 32, may store packet forwarding information, may execute packet processing software, and/or may execute other software instructions that control the functions of network device 10 and the other components therein. Some of these operations such as those associated with routing policy management software, routing protocol agents or processes, routing and/or forwarding information base agents, and packet processing software may occur after the device provisioning operation has successfully completed.

Packet processor(s) 32 may be used to implement a data plane or forwarding plane of network device 10. Packet processor(s) 32 may include one or more processors or processing units based on central processing units (CPUs), based on graphics processing units (GPUs), based on microprocessors, based on general-purpose processors, based on host processors, based on coprocessors, based on microcontrollers, based on digital signal processors, based on programmable logic devices such as a field programmable gate array device (FPGA), based on application specific system processors (ASSPs), based on application specific integrated circuit (ASIC) processors, and/or based on other processor architectures.

Packet processor 32 may receive incoming network traffic via input-output interfaces 34, parse and analyze the network traffic, process the network traffic based on packet forwarding decision data (e.g., in a forwarding information base) and/or in accordance with network protocol(s) or other forwarding policy, and forward (or drop) the network traffic accordingly. The packet forwarding decision data may be stored on a portion of memory circuitry 30 and/or other memory circuitry integrated as part of or separate from packet processor 32.

Input-output interfaces 34 may include different types of communication interfaces such as Ethernet interfaces (e.g., one or more Ethernet ports), optical interfaces, Bluetooth interfaces, Wi-Fi interfaces, and/or other network interfaces for connecting network device 10 to the Internet, a local area network, a wide area network, a mobile network, generally other network device(s) in these networks, and/or other computing equipment (e.g., host equipment such as server equipment, user equipment, etc.). As an example, at least some input-output interfaces 34 (e.g., those based on wired communication) may be implemented on physical ports 35 (sometimes referred to as sockets 35). These physical ports 35 may be configured to physically couple to and electrically connect to corresponding mating connectors of external components or equipment. Different ports 35 may have different form-factors to accommodate different cables, different modules, different devices, or generally different external equipment. As another example, at least some input-output interfaces 34 (e.g., those based on wireless communication) may be implemented using wireless communication circuitry (e.g., antennas, transceivers, radios, etc.).

Configurations in which network device 10 is configured to be communicatively coupled to external equipment such as a storage device 40 are sometimes described herein as an illustrative example. Storage device 40 may be communicatively coupled to device 10 via one or more interfaces 34 in a removable manner.

As an example, storage device 40 may have or be coupled to a mating connector that is receivable by a port 35 of network device 10. When inserted (plugged) into port 35, storage device 40 may be retained temporarily (e.g., prior to and/or during the device provisioning operation) by retaining structures at port 35 (e.g., latches, clips, friction-inducing structures, etc.) and may be released from the retaining structures thereafter (e.g., after initiation of the provisioning operation, after completion of the provisioning operation, after content on storage device 40 has been accessed, etc.) by a user disengaging storage device 40 from port 35.

While physical engagement and disengagement of storage device 40 from a port 35 of device 10 is described above as an illustrative example of storage device 40 being removably coupled to device 10, this is merely illustrative. If desired, storage device 40 may be removably coupled to network device 10 in one or more other manners instead of or in addition to the contact-based engagement and disengagement described above. As an example, storage device 40 may have corresponding input-output interfaces (e.g., having any of the components described in connection with input-output interfaces 34) such as wireless communication circuitry configured to communicate with network device 10 via an input-output interface 34. Accordingly, when device storage 40 is brought in close physical proximity (e.g., with or without contact) to device 10 to facilitate communication, storage device 40 may be coupled temporarily (e.g., prior to and/or during the device provisioning operation) to device 10 and may be decoupled from device 10 thereafter (e.g., after initiation of the provisioning operation, after completion of the provisioning operation, after content on storage device 40 has been accessed, etc.) by removing storage device 40 from the physical proximity of device 10.

In general, network device 10 and storage device 40 may each include any suitable electrical components or circuitry and/or mechanical structures to enable the removable coupling mechanism(s) therebetween. Storage device 40 may sometimes be referred to as a removably coupled storage device 40 when communicatively coupled to network device 10 in a removable manner. Accordingly, storage device 40 may also be referred to as removable storage device 40 (e.g., removable from network device 10), external storage device 40 (e.g., external to network device 10), and external removable storage device 40.

Storage device 40 may be any suitable device with memory circuitry 42 (e.g., having any of the components described in connection with memory circuitry 30). As an example, storage device 40 may be an external drive such as a Universal Serial Bus (USB) drive (e.g., a flash-memory-based USB drive), a portable solid-state drive, a portable hard disk drive, and/or any other dedicated storage device. As another example, storage device 40 may be a larger, more complex computing device such as a laptop computer, a desktop computer, server equipment, and/or other general computing equipment having storage (e.g., memory circuitry 42).

Configurations in which storage device 40 is an external drive such as a USB drive (sometimes referred to as a USB key) are sometimes described herein as an illustrative example. In these configurations, the mechanism by which device 40 is removably coupled to device 10 may include mating USB connectors (e.g., device 10 may include a USB port 35 compliant with or compatible with a corresponding USB standard and device 40 may include a mating USB connector pluggable into USB port 35). This example is merely illustrative. If desired, other types of storage devices 40 and/or other mechanisms by which device 40 is removably coupled to device 10 may be used.

Still referring to FIG. 2, in configurations in which network device 10 is an initially un-provisioned network device, processing circuitry 28 on network device 10 may execute a device provisioning agent 36 (sometimes referred to herein as a device provisioning process 36) that helps manage and facilitate the device self-provisioning operation described herein after the initially un-provisioned device 10 is supplied with power and is communicatively coupled to router 12 and/or server equipment 14 (e.g., by having a network connection). If desired, this provisioning operation may be initiated automatically by executing agent 36 based on one or more criteria being met. The one or more criteria can include network device 10 being connected to a power source, network device 10 being coupled to one or more elements of network 8, network device 10 being coupled to storage device 40, network device 10 lacking an initial configuration, network device 10 receiving one or more user inputs such as the pressing of a button, the providing of a key or other security element, or generally any specified input via a user interface, and/or other suitable provisioning criteria.

Configured in this manner, network device 10 may sometimes be referred to herein as a network device configured for secure zero touch provisioning, zero touch provisioning, one touch provisioning, or minimal touch provisioning. If desired, network device 10 (e.g., device provisioning agent 36) may operate in compliance with or compatible with the Secure Zero Touch Provisioning (SZTP) standard and/or other standards set forth by the Internet Engineering Task Force (e.g., in Request for Comments (RFC) 8572).

Processing circuitry 28 may also execute threads or tasks for a kernel such as kernel 38. Kernel 38 may, among other functions, implement network interfaces (e.g., interfaces 34 over physical ports 35) based on communication protocols (e.g., transport layer protocols, network layer protocols, data link layer protocols, etc.) and form corresponding communication sockets using device interface configuration information, thereby implementing a communication protocol stack (e.g., a TCP/IP stack) with which network device 10 can communicate with external equipment.

As part of the device provisioning operation, device 10 (e.g., device provisioning agent 36) may obtain the device interface configuration information such as the network address (e.g., IP address) of network device 10. Kernel 38 may use the obtained device interface configuration information to form one or more network layer interfaces (e.g., one or more IPv4 and/or IPv6 interfaces) for device 10.

Device provisioning agent 36 may subsequently communicate with device bootstrapping server 20 (FIG. 1) as facilitated by storage device 40 to obtain configuration information (e.g., executable files, networking data such as routing and forwarding decision data, network policy information, etc., and generally other types of configuration file(s) via the network interfaces (e.g., interfaces 34) established by kernel 38.

Processing circuitry 28 may execute device provisioning agent 36 and kernel 38 by executing software instructions stored on memory circuitry 30. While device provisioning agent 36 and kernel 38 are described to perform respective parts of the device provisioning operation for provisioning device 10, this is merely illustrative. Processing circuitry 28 may be organized in any suitable manner (e.g., to have any other agents or processes instead of or in addition to device provisioning agent 36 and/or kernel 38) to perform each part of the device provisioning operation. Accordingly, control circuitry 26 and/or processing circuitry 28 may sometimes be described herein to perform the device provisioning operation instead of specifically referring to the one or more agents, processes, and/or kernel executed by processing circuitry 28.

Figure 3:
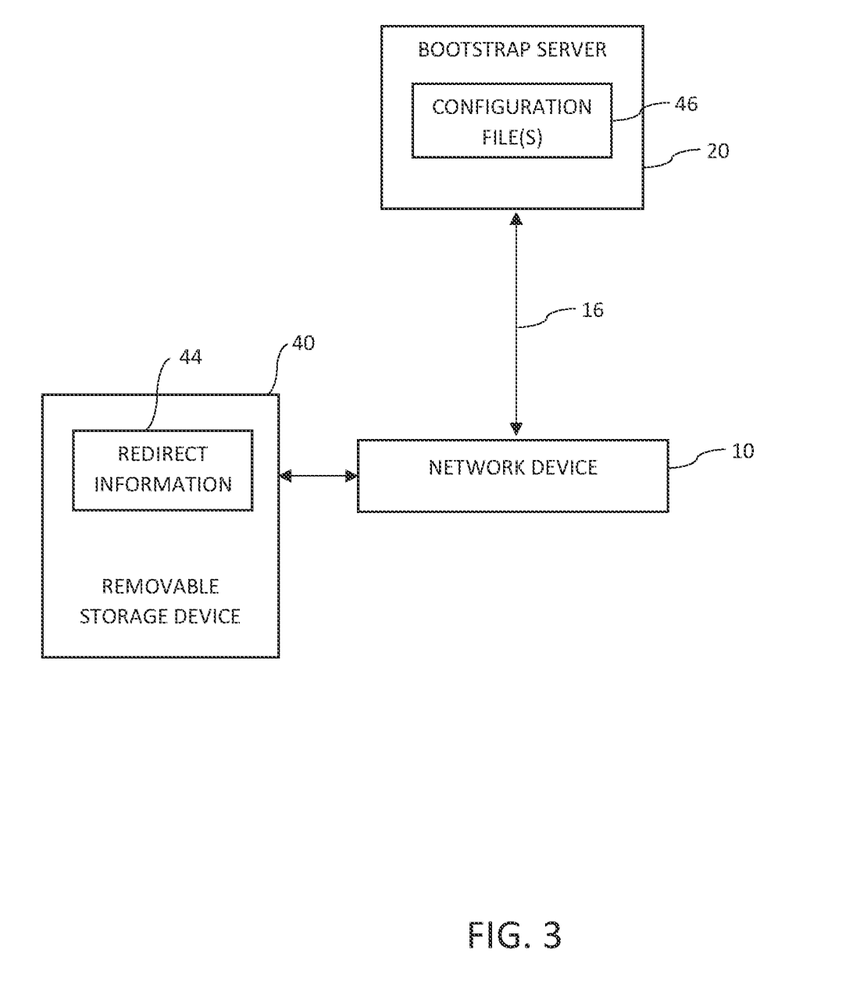
FIG. 3 is a diagram of an illustrative network device configured to operate with a removable storage device to facilitate device provisioning operation in accordance with some embodiments.

FIG. 3 is a diagram of an illustrative network device provisioning system in which storage device 40 and bootstrap server 20 facilitate the provisioning of network device 10. In the example of FIG. 3, storage device 40 may be communicatively and removably coupled to network device 10 (e.g., inserted into a port 35 of device 10, connected to device 10 via an intervening connector cable inserted into a port 35 of device 10, brought into physical proximity to device 10 to facilitate wireless communication, etc.). Coupled in this manner, network device 10 (e.g., processing circuitry 28 in FIG. 2) may access content stored in storage device 40. If desired, network device 10 may detect the presence of storage device 40 and access the content stored in storage device 40 (automatically) in response to the detected presence of storage device 40 to initiate its self-provisioning operation based on a provisioning scheme that utilizes an external removable storage device.

Configurations in which storage device 40 (e.g., memory circuitry 42 in FIG. 2) stores redirect information 44 that identifies or is otherwise indicative of one or more bootstrap servers from which device 10 can obtain provisioning information such as configuration files are sometimes described herein as an example. In this example, based on redirect information 44, device 10 may form a connection to server 20 via path 16. The connection may be a secure connection (e.g., a connection over which encrypted data is conveyed). Depending on the provisioning information accessed from storage device 40, this initial connection established based on redirect information 44 may be a trusted connection (e.g., a connection to a bootstrap server that has been established as a trusted source of provisioning information) or an untrusted connection (e.g., a connection to a bootstrap server that has not been established as a trusted source of provisioning information).

Figure 4:
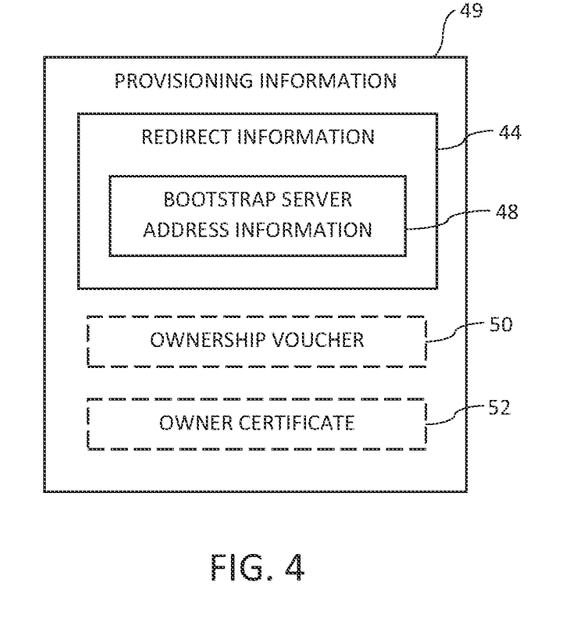
FIG. 4 is a diagram of illustrative redirect information stored on a removable storage device in accordance with some embodiments.
Figure 5:
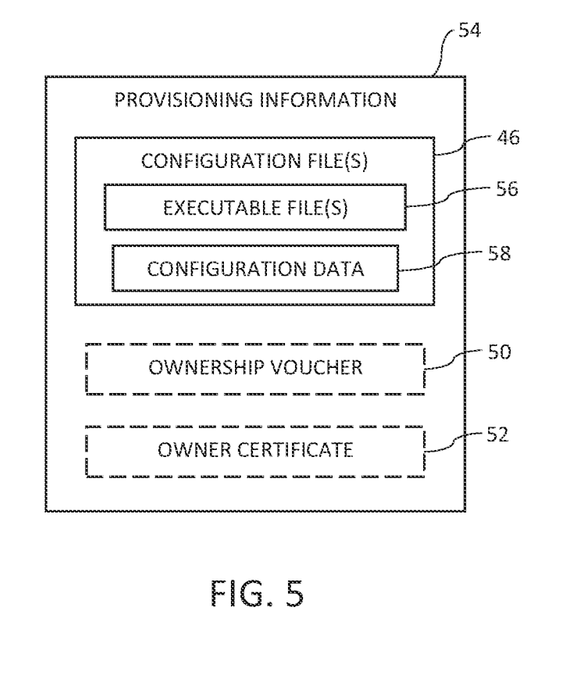
FIG. 5 is a diagram of illustrative configuration information accessible from a device configuration server in accordance with some embodiments.

These two types of connections are further described in connection with FIGS. 4 and 5. FIG. 4 shows illustrative provisioning information 49 that may be stored at memory circuitry 42 of storage device 40 (FIG. 3), while FIG. 5 shows illustrative provisioning information 54 that may be stored at bootstrap server 20 (FIG. 3).

As described herein, provisioning information (e.g., bootstrapping data in the context of RFC 8572) generally refers to the various types of information conveyed to network device 10 to facilitate its provisioning operation. As examples, provisioning information may include (bootstrap) redirect information, configuration files (sometimes referred to herein as configuration information), validation information for the (bootstrap) redirect information and/or configuration files. The redirect information described herein may generally facilitate bootstrapping of network device 10 for device provisioning (e.g., by indicating a source of bootstrapping data or a source of additional bootstrap redirect information) and may sometimes be referred to herein as bootstrap redirect information.

One or more pieces of provisioning information (e.g., one or more artifacts in the context of RFC 8572) such as redirect information, configuration file(s), ownership voucher(s), and/or an owner certificate may be received by device 10 (from device 40 and/or server 20) in secure forms such as in signed, encrypted, and/or generally encoded forms (e.g., signed and/or encrypted in a manner that is in compliance with RFC 8572). Piece(s) of provisioning information may be secured (e.g., signed, encrypted, and/or encoded) individually or collectively. Device 10 (e.g., agent 36 executing on processing circuitry 28) may validate, decrypt, and/or generally decode the received (secure) version of the one or more pieces of provisioning information to obtain usable forms of provisioning information (e.g., the raw redirect information, the raw configuration files, extracted certificate(s), etc.).

As shown in the example of FIG. 4, provisioning information 49 on storage device 40 may include redirect information 44. Redirect information 44 may include address information 48 for one or more bootstrap servers such as a corresponding bootstrap server 20. In configurations described herein as an illustrative example, address information 48 may include one or more Uniform Resource Locator (URL) addresses for one or more corresponding bootstrap server(s). The URL address(es) may indicate a secure protocol (e.g., HTTPS (Hypertext Transfer Protocol Secure)) in order to establish the secure connection between device 10 and the corresponding server 20 (FIG. 3). If desired, other types of addresses may be used to locate and/or address bootstrap server(s).

As one illustrative example, redirect information 44 stored on storage device 40 may be signed and/or encrypted (or generally in a secure or encoded form). Accordingly, network device 10 may retrieve the secure (e.g., signed and/or encrypted) version of redirect information 44 from storage device 40. In this example, storage device 40 (e.g., memory circuitry 42 in FIG. 2) may also store validation information such as ownership voucher(s) 50 and owner certificate 52 (e.g., secure versions of ownership voucher(s) 50 and owner certificate 52). Network device 10 may obtain the validation information (e.g., by decoding the secure version of validation information received from storage device 40) and use the obtained validation information to further validate the secure version of redirect information 44. Based on the validation of redirect information 44, network device 10 may establish trust in storage device 40 (as a trusted source of provisioning information) and/or consequently establish trust in server 20 (as a trusted source of provisioning information) based on address information 48 of server 20 being indicated by a trusted storage device 40. Accordingly, the connection between network device 10 and server 20 over path 16 (FIG. 3) may be a trusted connection to a trusted source of provisioning information.

In particular, redirect information 44 obtained by device 10 may be secured (e.g., signed and/or encrypted) using an owner certificate. Device 10 may validate the secure version of redirect information 44 prior to use (e.g., in establishing the connection to server 20). As part of the validation process, device 10 may authenticate a secure (e.g., signed and/or encrypted) version of ownership voucher 50 obtained from storage device 40 by validating the signature of ownership voucher 50 based on one of the pre-configured (e.g., stored) trust anchors (e.g., using additional intermediate certificate(s) associated with the ownership voucher as applicable). The trust anchors may be stored internally on memory circuitry 30 (FIG. 2), e.g., in preparation for network device deployment, or generally stored at a trusted storage device accessible by processing circuitry 28 (e.g., by agent 36 thereon) after network device deployment. Upon successful authentication of ownership voucher 50, device 10 may extract a certificate (e.g., an X.509 certificate) from ownership voucher 50. Device 10 may further validate a secure (e.g., signed and/or encrypted) version of owner certificate 52 based on the extracted certificate (e.g., by performing an X.509 certificate path verification to the extracted certificate). Device 10 may then verify that the secure version of redirect information 44 was signed and/or encrypted by the validated owner certificate 52. Thereafter, device 10 may use redirect information 44 obtained from storage device 40 to establish a secure and trusted connection to server 20.

As another illustrative example, redirect information 44 obtained by device 10 may be unsigned and storage device 40 may store (an unsigned version of) redirect information 44 and omit any validation information (e.g., omit ownership voucher 50 and owner certificate 52). In this example, device 10 may still use redirect information 44 obtained from storage device 40. However, the connection over path 16 may be a secure but untrusted connection.

After establishing the (untrusted or trusted) connection to server 20 over path 16 (FIG. 3), server 20 may similarly provide provisioning information with or without validation information to network device 10. As shown in FIG. 5, provisioning information 54 stored at bootstrap server 20 may include configuration files 46. Configuration files 46 may include one or more executable files 56 (e.g., a pre-configuration script and/or a post-configuration script as described in the context of RFC 8572) and may include configuration data (e.g., networking data, boot image information, and/or other configuration data desired to be stored at memory circuitry 30 as part of device provisioning). Provisioning information 54 may optionally include validation information such as ownership voucher(s) 50 and owner certificate 52. Network device 10 may obtain provisioning information 54 via the connection (over path 16) established using redirect information 44 (FIG. 3) obtained from storage device 40.

As one illustrative example, configuration files 46 obtained by device 10 from server 20 may be unsigned and server 20 may store (an unsigned version of) configuration files 46 and omit any validation information (e.g., omit ownership voucher 50 and owner certificate 52). In this example, device 10 may still use (e.g., process) configuration files 46 obtained from server 20 if configuration files 46 are received from server 20 over a trusted connection (e.g., established based on the validation of signed and/or encrypted redirect information 44) and/or server 20 being established as a trusted source of provisioning information.

As another illustrative example, configuration files 46 may be secured (e.g., signed and/or encrypted using an owner certificate). Accordingly, network device 10 may obtain a secure version of configuration files 46 from server 20. In this example, server 20 may also store a secure version of validation information such as (signed and/or encrypted) ownership voucher(s) 50 and (signed and/or encrypted) owner certificate 52. Network device 10 may obtain, from server 20, the validation information to validate the secure version of configuration files 46 to establish trust in server 20 (as a trusted source of provisioning information).

The validation of the secure version of configuration files 46 may be analogous to the validation of the secure version of redirect information 44 as described above. For example, network device may authenticate a secure version of ownership voucher 50 by validating the signature of ownership voucher 50 based on one of the pre-configured trust anchors, extract a certificate from ownership voucher 50, validate a secure version of owner certificate 52 based on the extracted certificate, and verify that the secure version of configuration files 46 was signed and/or encrypted by the validated owner certificate 52.

If desired, the secure versions of configuration files 46 and corresponding validation information may be provided to device 10 if the connection (over path 16 in FIG. 3) between device 10 and server 20 (initially established based on unsigned redirect information 44) is an untrusted connection. Accordingly, after validation of the secure version of configuration files 46, network device 10 may promote or otherwise convert the initially untrusted connection to server 20 to a trusted connection to server 20. As an example, after validation of the secure version of configuration files 46, device 10 may disconnect the initially untrusted connection to server 20 and may re-establish the connection to server 20 as a trusted connection.

Configurations in which provisioning information 49 and 54 are used by network device 10 to perform secure zero touch provisioning (e.g., in compliance with at least some portions of RFC 8572) are sometimes described herein as an illustrative example. However, if desired, the use of provisioning information 49 from storage device 40 by network device 10 and the use of provisioning information 54 from server 20 by network device 10 may be for performing other types of operations (e.g., to perform zero touch provisioning, to perform other types of device provisioning in accordance with other standards, to perform non-standards-compliant device provisioning, etc.). When applied to (a non-secure version of) zero touch provisioning, provisioning information 49 and 54 may both lack signed and/or encrypted data and the corresponding validation information for validating the signed and/or encrypted data. Accordingly, the connection between network device 10 and server 20 may be untrusted.

Figure 6:
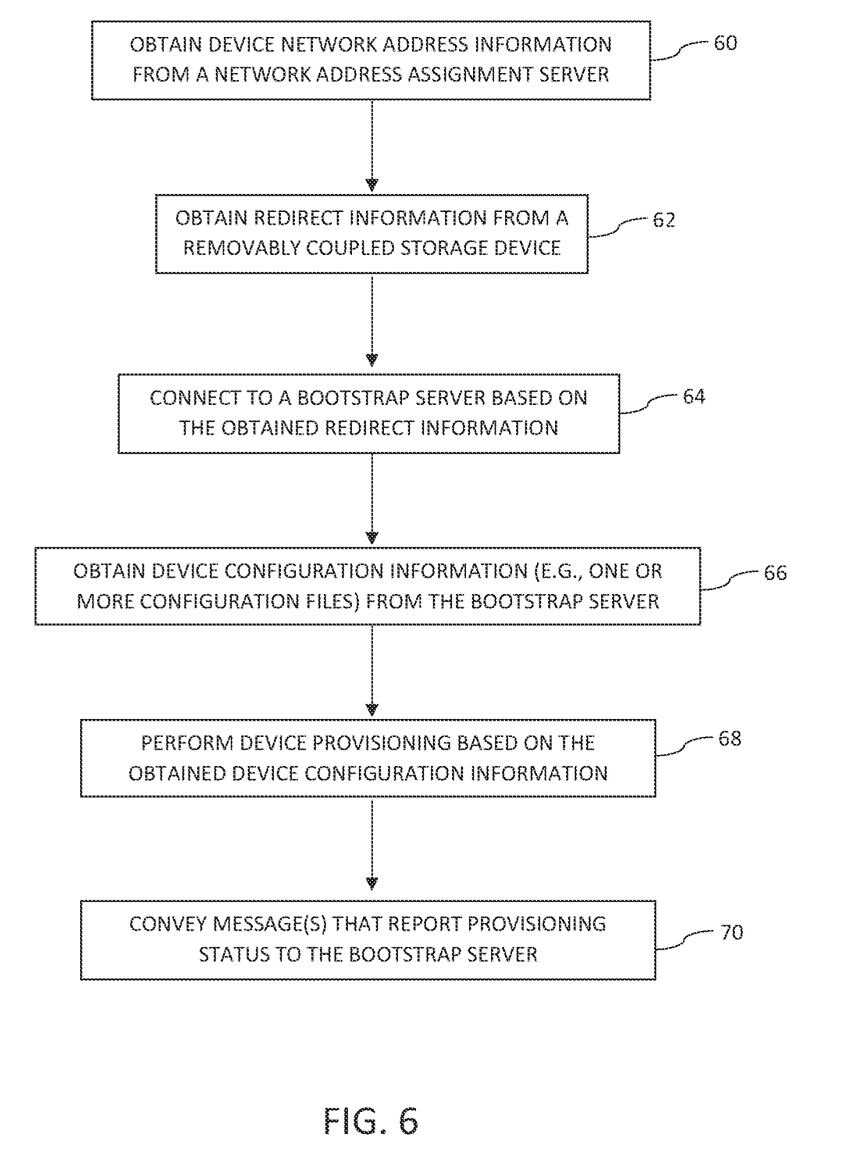
FIG. 6 is a flowchart of illustrative operations for obtaining redirect information using a removable storage device in accordance with some embodiments.

FIG. 6 is a flowchart of illustrative operations for performing device provisioning using a removably coupled storage device (e.g., storage device 40) and a bootstrap server (e.g., bootstrap server 20). These operations may be performed at one or more processors of processing circuitry 28 in device 10. The illustrative operations described in connection with FIG. 6 may generally be performed by processing circuitry 28 in device 10 by executing software instructions stored on memory circuitry 30. If desired, one or more operations described in connection with FIG. 6 may be performed by other dedicated hardware components in device 10. In an illustrative configuration described herein as an example, the operations described in connection with FIG. 6 may be performed by device provisioning agent 36 and kernel 38, or generally by processing circuitry 28 on which they are implemented.

At block 60, processing circuitry 28 (e.g., device provisioning agent 36) may obtain device network address information from a network address assignment server (e.g., a DHCP server). In particular, processing circuitry 28 (e.g., kernel 38) may obtain an IP address for device 10 and may use the IP address and other interface configuration information to set up (e.g., generate) one or more corresponding interfaces over which device 10 can communicate with a bootstrap server.

At block 62, processing circuitry 28 (e.g., device provisioning agent 36) may obtain redirect information (e.g., redirect information 44) from a removably coupled storage device (e.g., an external removable storage device received at a port of device 10). In scenarios where the redirect information is obtained as a secure (e.g., signed and/or encrypted) version of the redirect information, processing circuitry 28 may also obtain validation information (e.g., ownership voucher(s), an owner certificate, etc.) and may validate the secure version of the redirect information prior to proceeding to block 64. If desired, processing circuitry 28 may detect the external storage device being connected to device 10 and may retrieve the redirect information (e.g., perform the operation described in connection with block 62) in response to detecting insertion (or generally, communicative coupling) of the external storage device.

At block 64, processing circuitry 28 (e.g., device provisioning agent 36 and kernel 38) may connect to the bootstrap server based on the obtained redirect information. As an example, the redirect information may contain a network address (e.g., a URL address) of the bootstrap server. Processing circuitry 28 may access the network address of the bootstrap server via the network interface generated at block 60 to establish a secure (e.g., encrypted) connection to the bootstrap server. The connection may also be a trusted connection if the secure version of the redirect information has been validated (e.g., as described in connection with block 62).

At block 66, processing circuitry 28 (e.g., device provisioning agent 36) may obtain device configuration information such as one or more configuration files (e.g., onboarding information as described in the context of RFC 8572) from the bootstrap server. In scenarios where the configuration information is obtained as a secure (e.g., signed and/or encrypted) version of the configuration information, processing circuitry 28 may also obtain validation information (e.g., ownership voucher(s), an owner certificate, etc.) and may validate the secure version of the configuration information prior to proceeding to block 68.

At block 68, processing circuitry 28 (e.g., device provisioning agent 36) may perform device provisioning based on the obtained configuration information (e.g., one or more configuration files containing executable files, files for storage, etc.). As examples, processing circuitry 28 may run (e.g., execute) any (binary and/or script-based) executable files in the configuration information, may store any configuration data (e.g., networking data, boot image information, etc.) in the configuration information, and/or may appropriately process other types of information in the configuration information.

At block 70, processing circuitry 28 (e.g., device provisioning agent 36) may convey one or more messages to report progress or otherwise indicate the status of the provisioning operation to the bootstrap server. As an example, processing circuitry 28 may send these reporting messages to the bootstrap server periodically during and/or after a time period during which the provisioning operation is performed. In other words, the operations performed at block 68 may occur during a first time period and the operations performed at block 70 may occur during a second time period at least partially overlapping the first time period in time.

In particular, processing circuitry 28 may send a reporting message when a particular part of the provisioning process has been completed (e.g., when a pre-configuration script and/or a post-configuration script has been successfully executed, when storage of configuration data has been successfully completed, etc.), when a particular part of the provisioning process has failed to complete or other types of failures have occurred, and/or when other predetermined events have occurred. If desired, reporting messages may be sent at regular intervals (e.g., indicating the status of device provisioning at each time of reporting). These reporting messages may be conveyed over a secure and trusted connection to the bootstrap server.

As part of block 64 in FIG. 6, processing circuitry 28 may establish a connection to the bootstrap server based on the redirect information obtained from the removable storage device. However, this initial connection may be secure but untrusted (e.g., because unsigned redirect information is retrieved and used). To successfully complete the provisioning operation and/or provide certain functionalities to the provisioning operation (e.g., the reporting functionalities described in connection with block 70), it may be desirable to subsequently establish a trusted connection to the bootstrap server.

Figure 7:
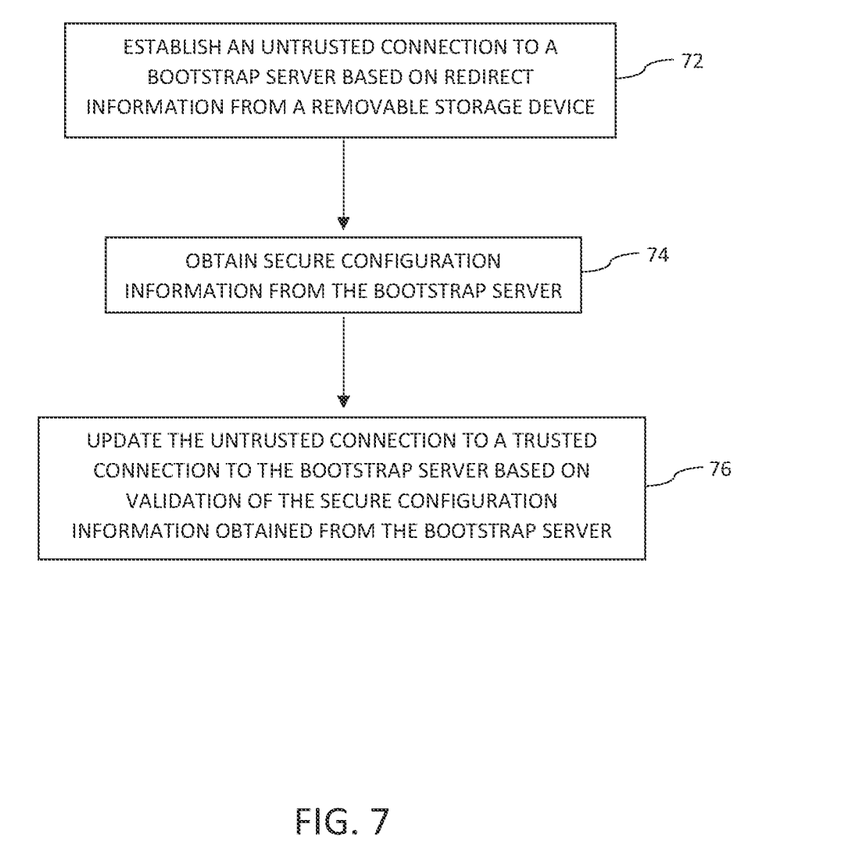
FIG. 7 is a flowchart of illustrative operations for converting an untrusted connection to a trusted connection for obtaining configuration information and/or for reporting provisioning status in accordance with some embodiments.

FIG. 7 is a flowchart of illustrative operations for establishing a trusted connection to a bootstrap server. These operations may be performed at one or more processors of processing circuitry 28 in device 10. The illustrative operations described in connection with FIG. 7 may generally be performed by processing circuitry 28 in device 10 by executing software instructions stored on memory circuitry 30. If desired, one or more operations described in connection with FIG. 7 may be performed by other dedicated hardware components in device 10. In an illustrative configuration described herein as an example, the operations described in connection with FIG. 7 may be performed by device provisioning agent 36 and kernel 38, or generally by processing circuitry 28 on which they are implemented.

At block 72, processing circuitry 28 (e.g., device provisioning agent 36) may establish an untrusted connection to a bootstrap server based on redirect information from a removable storage device. This may, in some scenarios, occur at block 64 in FIG. 6.

At block 74, processing circuitry 28 (e.g., device provisioning agent 36) may obtain secure (e.g., signed and/or encrypted) configuration information (e.g., one or more configuration files) from the bootstrap server. This may, in some scenarios, occur at block 66 in FIG. 6.

At block 76, processing circuitry 28 (e.g., device provisioning agent 36) may update the untrusted connection to a trusted connection to the bootstrap server based on validation of the secure configuration information obtained from the bootstrap server. As described herein as an example, the configuration information may be signed and/or encrypted using an owner certificate and the validation process may entail receiving validation information along with the secure configuration information to verify, based on the received validation information, that the configuration information is signed and/or encrypted using the appropriate owner certificate.

In some illustrative configurations described herein as an example, processing circuitry 28 may disconnect from the untrusted connection and may re-establish a trusted connection to the bootstrap server. If desired, the trust connection may be formed in any suitable manner.

The operations described in connection with block 76 may be completed prior to blocks 68 and/or 70 in FIG. 6. In particular, the validation of the secure configuration information may be completed prior to performing the device provisioning based on the configuration information and the trusted connection may be established beforehand such that reporting messages are conveyed using the trusted connection (instead of an untrusted connection).

In some instances, secure redirect information (instead of secure configuration information at block 74) may be obtained from the bootstrap server. The redirect information may identify the network address (e.g., an URL address) of another bootstrap server that instead provides the configuration information. In these instances, processing circuitry 28 may sever the untrusted connection to the first bootstrap server and establish a trusted connection to the second bootstrap server. Processing circuitry 28 may further perform the operations described in connection with blocks 66, 68, and/or 70 with the second bootstrap server.

The operations described in connection with each of FIGS. 6 and 7 are merely illustrative. If desired, one or more of these operations within any of FIGS. 6 and 7 may be omitted and/or changed. If desired, one or more additional operations may be performed in addition to the operations described in connection with any of FIGS. 6 and 7. If desired, the order of the operations described in connection with any of FIGS. 6 and 7 may be changed. If desired, some operations described in connection with each of FIGS. 6 and 7 may be performed in parallel with each other (e.g., across multiple components such as across multiple processors of device 10) and/or some operations described in connection with each of FIGS. 6 and 7 may be performed sequentially (e.g., at only a single component such as at a processor of network device 10).

The methods and operations described above in connection with FIGS. 1-7 may be performed by the components of one or more network devices and/or server or other host equipment using software, firmware, and/or hardware (e.g., dedicated circuitry or hardware). Software code for performing these operations may be stored on one or more non-transitory computer-readable storage media (e.g., tangible computer readable storage media) on one or more of the components of the network device(s) and/or server or other host equipment. The software code may sometimes be referred to as software, data, instructions, program instructions, or code. The non-transitory computer-readable storage media may include drives, non-volatile memory such as non-volatile random-access memory (NVRAM), removable flash drives or other removable media, other types of random-access memory, etc. Software stored on the non-transitory computer readable storage media may be executed by processing circuitry on one or more of the components of the network device(s) and/or server or other host equipment (e.g., processing circuitry 28 in network device 10).

The foregoing is merely illustrative and various modifications can be made to the described embodiments. The foregoing embodiments may be implemented individually or in any combination.

What is claimed is:

1. A method for performing secure device provisioning, the method comprising:
    obtaining, by a network device, redirect information from a removable storage device, the redirect information indicating a device configuration server, wherein obtaining the redirect information from the removable storage device comprises:
        obtaining, by the network device, a secure version of the redirect information from the removable storage device;
        obtaining, by the network device, validation information for the secure version of the redirect information; and
        validating, by the network device, the secure version of the redirect information based on the validation information;
    after validating the secure version of the redirect information, connecting, by the network device, to the device configuration server based on the redirect information;
    obtaining, by the network device, configuration information from the device configuration server; and
    processing, by the network device, the configuration information to provision the network device.

2. The method defined in claim 1, wherein the redirect information comprises an address for the device configuration server.

3. The method defined in claim 2 further comprising:
    obtaining, by the network device, a network address of the network device;
    forming, by the network device, a network interface based on the obtained network address, wherein connecting to the device configuration server comprises connecting to the address for the device configuration server via the network interface.

4. The method defined in claim 3, wherein the address for the device configuration server comprises a Uniform Resource Locator (URL) address.

5. The method defined in claim 1 further comprising:
    receiving the removable storage device at a port of the network device, wherein obtaining the redirect information from the removable storage device is based on detecting the removable storage device being received at the port.

6. The method defined in claim 5, wherein the removable storage device comprises an external drive having memory circuitry configured to store the secure version of the redirect information and the validation information.

7. The method defined in claim 1, wherein connecting to the device configuration server comprises establishing, by the network device, a trusted connection to the device configuration server based on validating the secure version of the redirect information.

8. The method defined in claim 7, wherein obtaining the configuration information from the device configuration server and processing the configuration information to provision the network device are based on the established connection being trusted.

9. The method defined in claim 7 further comprising:
    sending, by the network device, a message reporting status of network device provisioning to the device configuration server over the trusted connection, wherein the trusted connection is secure.

10. The method defined in claim 1, wherein the configuration information comprises at least one of an executable file or configuration data, wherein the executable file is a script-based executable file or a compiled binary executable file, and wherein processing the configuration information to provision the network device comprises at least one of: executing, by the network device, the executable file, or storing, by the network device, the configuration data.

11. The method defined in claim 1, wherein the secure version of the redirect information is validated by verifying that the secure version of the redirect information is signed or encrypted by a validated certificate.

12. An un-provisioned network device configured to perform device self-provisioning, the un-provisioned network device comprising:
    a port;
    a packet processor;
    memory circuitry; and
    processing circuitry coupled to the memory circuitry, the packet processor, and the port and configured to:
        obtain unsigned address information of a bootstrap server from an external storage device based on the external storage device being connected to the port;
        connect to the bootstrap server using an untrusted connection based on the address information being unsigned;
        obtain a secure version of configuration information from the bootstrap server via the untrusted connection;
        validate the secure version of the configuration information obtained from the bootstrap server;

update the untrusted connection to a trusted connection based on the secure version of the configuration information being validated;

process the configuration information to provision the un-provisioned network device; and send one or more messages indicative of self-provisioning operation status to the bootstrap server.

13. The un-provisioned network device defined in claim 12, wherein the processing circuitry is configured to obtain the validation information from the bootstrap server.

14. The un-provisioned network device defined in claim 12, wherein the processing circuitry is configured to connect to the bootstrap server using the trusted connection prior to processing the configuration information and prior to sending the one or more messages indicative of self-provisioning operation status to the bootstrap server.

15. The un-provisioned network device defined in claim 12, wherein the configuration information is processed during a time period and wherein the processing circuitry is configured to send messages indicative of self-provisioning operation status to the bootstrap server periodically during the time period.

16. The un-provisioned network device defined in claim 12, wherein the processing circuitry is configured to update the untrusted connection to the trusted connection by disconnecting the untrusted connection and re-establishing a connection to the bootstrap server as the trusted connection.

17. One or more non-transitory computer-readable storage media comprising computer-executable instructions that, when executed by one or more processors for a network device, cause the one or more processors to:

obtain signed redirect information from an external storage device communicatively coupled to the network device;

obtain validation information from the external storage device;

validate the signed redirect information based on the validation information;

establish a trusted and encrypted connection to a device configuration server based on the validation of the signed redirect information;

receive provisioning information from the device configuration server over the trusted and encrypted connection; and process the received provisioning information to provision the network device.

18. The one or more non-transitory computer-readable storage media defined in claim 17 further comprising computer-executable instructions that, when executed by the one or more processors, cause the one or more processors to:

send a plurality of reporting messages over the trusted and encrypted connection to the device configuration server during a time period during which the provisioning information is processed.

19. The one or more non-transitory computer-readable storage media defined in claim 17, wherein the validation information comprises an owner certificate and one or more ownership vouchers.

20. The one or more non-transitory computer-readable storage media defined in claim 17, wherein the signed redirect information is signed using a certificate.

* * * * *